US010253902B2

(12) United States Patent
Warashina et al.

(10) Patent No.: US 10,253,902 B2
(45) Date of Patent: *Apr. 9, 2019

(54) ELECTROMAGNETIC VALVE

(71) Applicant: HAMANAKODENSO CO., LTD., Kosai, Shizuoka-Pref. (JP)

(72) Inventors: Tomoaki Warashina, Toyohashi (JP); Takao Ishida, Toyohashi (JP); Masashi Sugano, Kosai (JP)

(73) Assignee: HAMANAKODENSO CO., LTD., Kosai, Shizuoka-Pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/917,994

(22) Filed: Mar. 12, 2018

(65) Prior Publication Data

US 2018/0195635 A1 Jul. 12, 2018

Related U.S. Application Data

(63) Continuation of application No. 15/252,517, filed on Aug. 31, 2016, now Pat. No. 9,945,493.

(30) Foreign Application Priority Data

Oct. 28, 2015 (JP) ................. 2015-212088

(51) Int. Cl.
*F16K 31/06* (2006.01)
*F16H 61/02* (2006.01)

(52) U.S. Cl.
CPC ..... *F16K 31/0686* (2013.01); *F16H 61/0251* (2013.01); *F16K 31/0655* (2013.01); *F16K 31/0675* (2013.01); *F16H 2061/026* (2013.01)

(58) Field of Classification Search
CPC ............ F16K 31/0603; F16K 31/0624; F16K 31/0627; F16K 31/0655; F16K 31/0693;
(Continued)

(56) References Cited

U.S. PATENT DOCUMENTS 4,915,134 A 4/1990 Toliusis et al.
5,771,933 A * 6/1998 Akamatsu ............. B60T 13/665
137/596.17

(Continued)

FOREIGN PATENT DOCUMENTS

JP S50-028923U1 A 3/1975
JP H04-331881 11/1992
(Continued)

OTHER PUBLICATIONS

U.S. Appl. No. 15/252,517, filed Aug. 31, 2016, Tomoaki Warashina.

*Primary Examiner* — Matthew W Jellett
(74) *Attorney, Agent, or Firm* — Harness, Dickey & Pierce, P.L.C.

(57) ABSTRACT

An electromagnetic valve includes a valve compartment inside an end tubular portion of a housing, a valve element provided in the valve compartment and movable to open or close a valve port, a guide member slidably supporting the valve element, a shaft contacting an end of the valve element to move the valve element, and a pressure release passage through which an inner compartment of the valve element communicates with the valve port in a closed state of the valve element.

5 Claims, 4 Drawing Sheets

(58) Field of Classification Search
CPC .............. F16K 39/022; F16H 61/0009; F16H 2061/0253; Y10T 137/87708; Y10T 137/87772; Y10T 137/87217; Y10T 137/87209; F01L 2001/3443
See application file for complete search history.

(56) References Cited

U.S. PATENT DOCUMENTS

| | | | | |
|---|---|---|---|---|
| 6,619,616 | B1 * | 9/2003 | Sudani | F16K 31/0637 137/596.17 |
| 6,810,909 | B2 * | 11/2004 | Herbert | F16K 31/0693 137/596.17 |
| 7,069,951 | B2 * | 7/2006 | Cornea | F01L 1/34 137/625.65 |
| 7,458,561 | B2 * | 12/2008 | Oishi | F16K 11/07 137/625.65 |
| 7,726,329 | B2 * | 6/2010 | Armiroli | F02M 59/366 123/511 |
| 7,857,282 | B2 * | 12/2010 | Goossens | B60T 8/363 251/129.02 |
| 7,971,607 | B2 * | 7/2011 | Ross | F15B 13/044 123/90.12 |
| 8,100,142 | B2 * | 1/2012 | Sasago | F15B 13/0405 137/596.17 |
| 8,434,518 | B2 * | 5/2013 | Okamoto | F16K 31/0655 137/596.17 |
| 9,169,941 | B2 * | 10/2015 | Lee | F16K 31/06 |
| 9,371,932 | B2 * | 6/2016 | Ando | F16K 27/0245 |
| 9,423,045 | B2 * | 8/2016 | Mills | F16H 61/0009 |
| 9,568,922 | B2 * | 2/2017 | Scherer | G05D 16/2033 |
| 9,583,248 | B2 * | 2/2017 | Toda | F16K 31/0665 |
| 2005/0098211 | A1 * | 5/2005 | Ichinose | F16K 31/0634 137/82 |

FOREIGN PATENT DOCUMENTS

| | | |
|---|---|---|
| JP | H04-331881 A | 11/1992 |
| JP | H9-250651 A | 9/1997 |

* cited by examiner

ELECTROMAGNETIC VALVE

CROSS REFERENCE TO RELATED APPLICATION

This application is a continuation of U.S. patent application Ser. No. 15/252,517 filed on Aug. 31, 2016, which claims the benefit and priority of Japanese Patent Application No. 2015-212088 filed on Oct. 28, 2015. The entire disclosures of each of the above applications are incorporated herein by reference.

TECHNICAL FIELD

The disclosure of the present specification relates to an electromagnetic valve used as a device that switches a flow pathway in a passage of working fluid.

BACKGROUND

An electromagnetic valve disclosed in Patent Document (JP H4-331881 A) is a device capable of switching a flow pathway in which a working fluid flows. According to the electromagnetic valve of the Patent Document, at the time of non-energization thereof, a ball valve presses a valve seat due to an applied pressure of a working fluid flowing from an inflow passage and closes the electromagnetic valve while a drain valve portion of a shaft keeps a drain port sheet in a valve opening state. At the time of energization of the electromagnetic valve, an electromagnetic force from a solenoid portion causes the shaft to move toward the ball valve and press the ball valve. Thus, the ball valve is removed from the valve sheet, and the electromagnetic valve is opened. The drain valve portion of the shaft closes the drain port sheet.

In the electromagnetic valve of the Patent Document, a pressure applied to the ball valve increases with increase in supply pressure of the working fluid. Thus, a necessary force for driving the shaft and causing the fluid to flow from the inflow passage through a communication passage to a discharge passage may increase. In order to enhance the force for driving the shaft, a method to increase a magnetic force is enlarging of a size of the solenoid portion, but an entire size of the electromagnetic valve may become large in this case. Further, if a cross-sectional area of the communication passage is reduced, a flow rate characteristic of the electromagnetic valve may deteriorate.

SUMMARY

It is an objective of the present disclosure to provide an electromagnetic valve capable of limiting deterioration in flow rate characteristic and reducing a device size by limiting a necessary valve driving force According to an aspect of the present disclosure, an electromagnetic valve includes a housing, an inlet passage, a valve element, a guide member, a shaft, and an electromagnetic solenoid portion. The housing includes an end tubular portion fitted to an attachment hole of a passage forming member, and a valve compartment positioned on an inner side of the end tubular portion. The passage forming member includes an upstream passage through which a working fluid flows toward the electromagnetic valve, and a downstream passage through which the working fluid flows out of the electromagnetic valve. The inlet passage is positioned on the inner side of the end tubular portion or provided in the end tubular portion, and the upstream passage and the valve compartment communicating with each other through the inlet passage. The valve element is provided in the valve compartment to open or close a valve port in between an open state in which the working fluid is allowed to flow from the valve compartment to the downstream passage and a closed state in which a flow of the working fluid is shut off. The guide member includes a support portion positioned in the valve compartment, and the support portion supports the valve element slidably in an axial direction. The shaft presses and moves the valve element in the axial direction to be in the open state. The electromagnetic solenoid portion generates a driving force for driving the shaft in the axial direction. The valve element having a tubular body includes a pressure release passage through which an inner compartment of the tubular body communicates with the valve port in the closed state of the valve element.

According to the electromagnetic valve, deterioration in flow rate characteristic can be restricted, and size reduction of the device can be achieved by limiting the necessary valve driving force.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
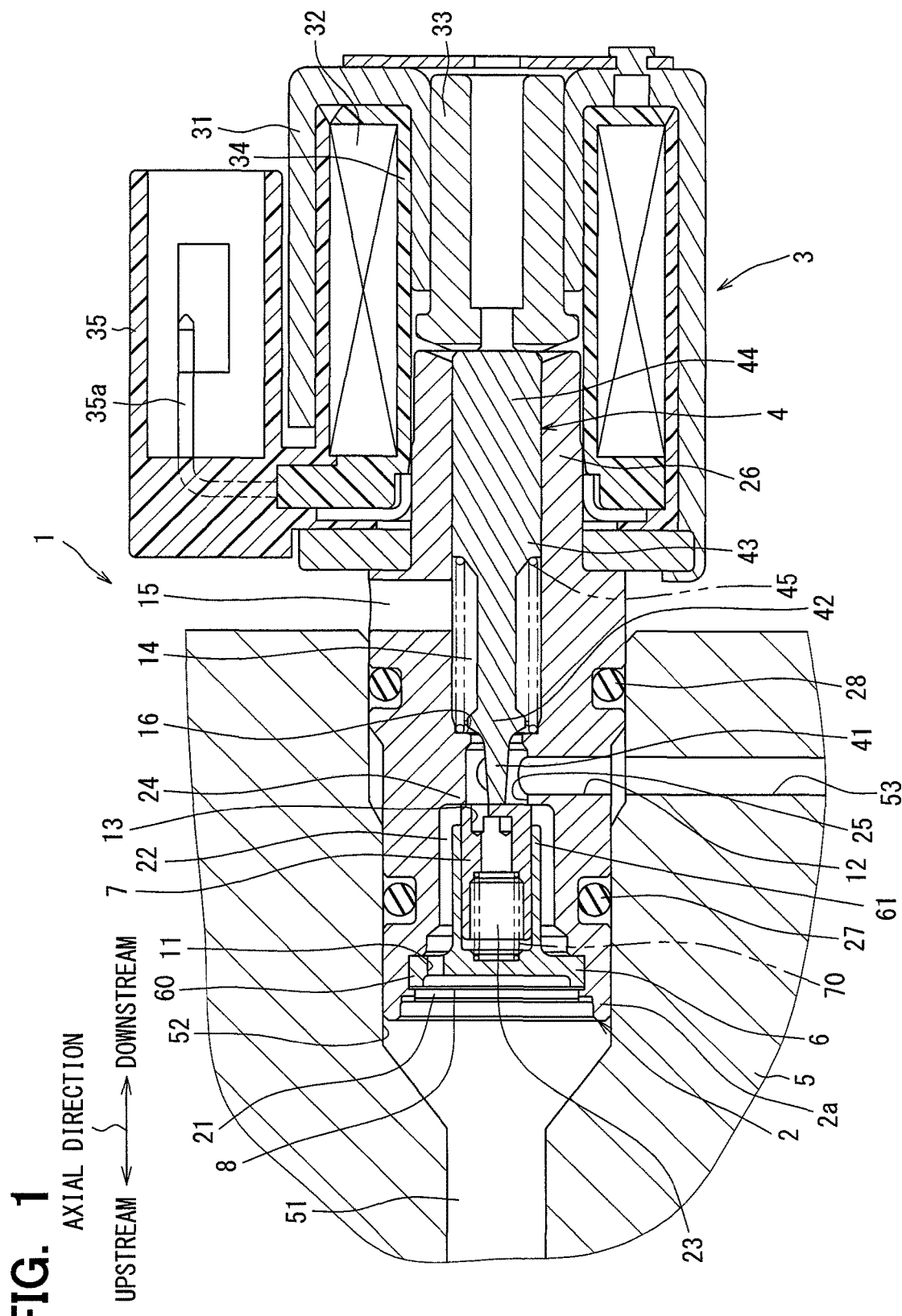
FIG. 1 is a sectional diagram illustrating an electromagnetic valve according to a first embodiment of the present disclosure.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 2:
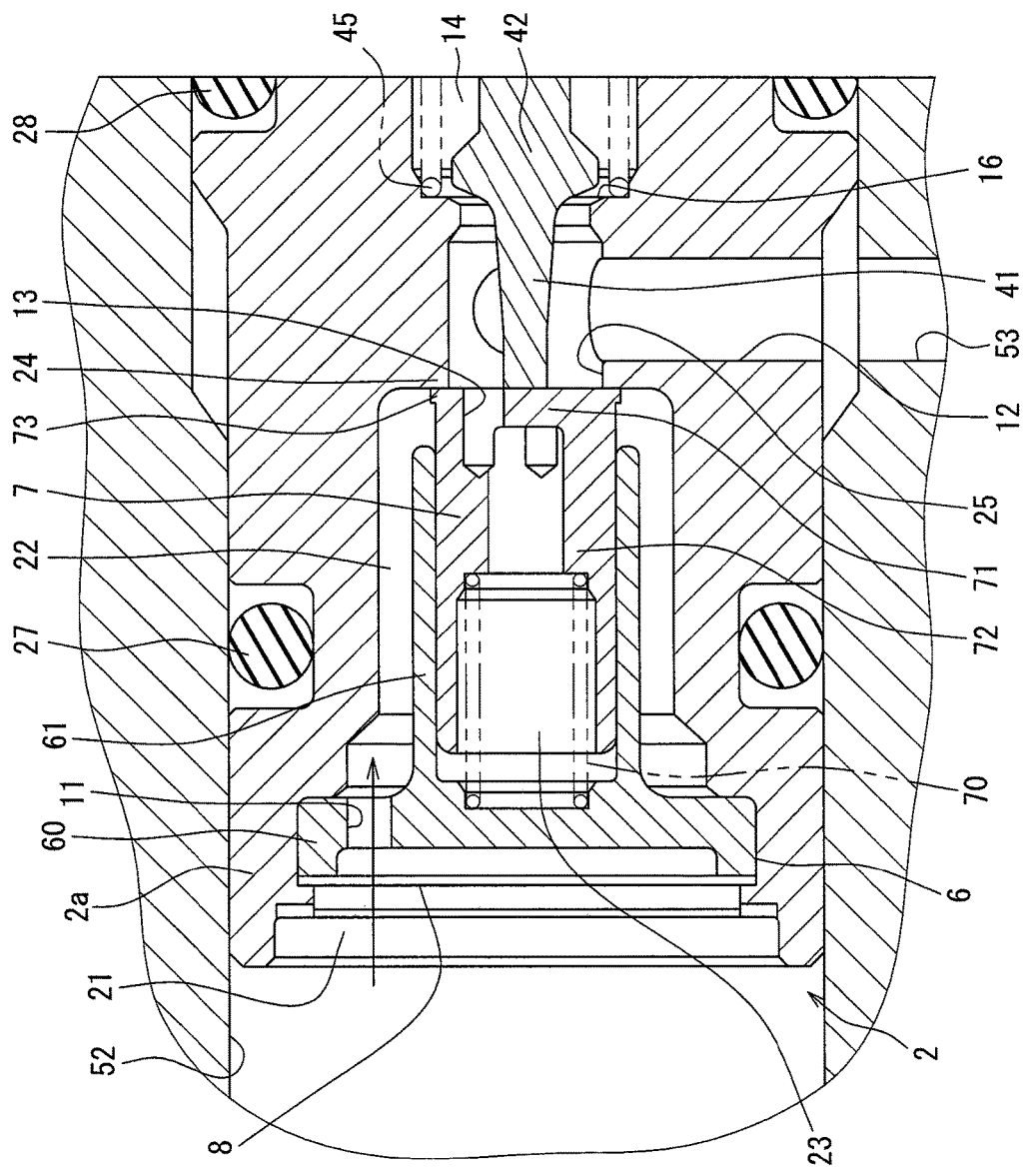
FIG. 2 is a sectional diagram illustrating a part of the electromagnetic valve according the first embodiment.

An electromagnetic valve 1 according to a first embodiment will be described referring to FIGS. 1 to 3. FIG. 1 shows an entire general configuration of the electromagnetic valve 1 that is, for example, installed in an automatic transmission system of an automobile. The electromagnetic valve 1 switches an oil pathway for control of shift transmission. The electromagnetic valve 1 includes a flow pathway control portion housed in a housing 2, and an electromagnetic solenoid portion 3 connected integrally to the flow pathway control portion. The flow pathway control portion includes the housing 2 that is tubular and extends in an axial direction of an attachment hole 52. An end tubular portion 2a located on an end of the housing 2 is fitted into and fixed to the attachment hole 52 that forms a column-shaped passage inside an automatic transmission device or a passage forming member 5 adjacent to the automatic transmission device. The passage forming member 5 forms an upstream passage 51 that is an oil inflow passage through which a pressure-adjusted oil flows as an example of a working fluid. The upstream passage 51 communicates with an inlet passage 11. The inlet passage 11 is a passage through which the upstream passage 51 communicates with a valve compartment 22.

The housing 2 includes a shaft holding portion 26 located on an opposite side in the axial direction from the end tubular portion 2a fixed to the attachment hole 52. The shaft holding portion 26 holds a shaft 4 movably in the axial direction, and attached to the electromagnetic solenoid portion 3 to which an outer side of the shaft holding portion 26 is fitted.

Inside the housing 2, a filter compartment 21 is provided at a position near to an end of the housing 2. The filter compartment 21 is a space of the electromagnetic valve 1 into which the oil from the automatic transmission device flows first. A filter member 8 is installed in the filter compartment 21 to cover an entire cross-sectional surface of a passage and percolate the oil that is the working fluid.

The housing 2 includes the valve compartment 22 communicating with a downstream side of the inlet passage 11, and a valve port 25 is open in a downstream end part of the valve compartment 22. The housing 2 includes an inner discharge passage 14 that is located on a downstream side of the valve port 25 and communicates with an outer discharge passage 15. The housing 2 further includes an outflow port 12 that extends radially outward and intersects with the axial direction between the valve port 25 and the inner discharge passage 14. The outflow port 12 is connected to a downstream passage 53 that is used as an oil outflow passage formed in the passage forming member 5 and connected to a valve of a transmission.

The filter member 8 has a circular plate shape and is located on a most upstream part inside the end tubular portion 2a in an oil flow. The filter member 8 includes a mesh portion that is located upstream of the inlet passage 11 and faces to the inlet passage 11. The filter member 8 includes a frame portion surrounding an entire circumference of the mesh portion. The mesh portion is, for example, made by etching of a center part of a circular plate member. Another remained part that has not been etched constitutes the frame portion around the mesh portion. The filter member 8 may be, alternatively, manufactured by bonding or welding a mesh portion and a frame portion which are separate members.

The housing 2 includes a valve seat 24 with which a downstream end part 73 of a valve element 7 is capable of being in contact. The valve seat 24 constitutes a peripheral portion of the valve port 25 that is a through-hole extending through a center part of the valve compartment 22 in the axial direction. The valve compartment 22 includes a space positioned between the inlet passage 11 and the valve port 25, and houses a support portion 61 of a guide member 6 and the valve element 7. The valve element 7 moves between an open state of the valve port 25 and a closed state of the valve port 25 by an operation of the electromagnetic valve 1. When the downstream end part 73 is separated from the valve seat 24, the valve element 7 is controlled to be in the open state in which the working fluid flows from the valve compartment 22 to the downstream passage 53. When the downstream end part 73 contacts the valve seat 24, the valve element 7 is controlled to be in the closed state in which the flow of the working fluid is blocked.

The valve element 7 is a tubular body and includes a bottom portion 71 contacting the valve port 25, and an end part opposite the bottom portion 71 has an opening. A periphery part of the bottom portion 71 is the downstream end part 73. The bottom portion 71 includes a pressure release passage 13 extending through a part other than a center part contacting the shaft 4. The pressure release passage 13 forms a passage through which a spring compartment 23 that is an example of an inner compartment of the valve element 7, i.e. tubular body, communicates with the valve port 25 when the valve port 25 is closed in the closed state.

The end tubular portion 2a houses the guide member 6 therein. The guide member 6 integrally includes the support portion 61 supporting the valve element 7 slidably in the axial direction, and an attachment portion 60 protruding radially outward from an upstream end part of the support portion 61. An outer circumference of the attachment portion 60 is in contact with an inner surface of the end tubular portion 2a. The attachment portion 60 is fixed to the end tubular portion 2a by swaging an inner wall of the end tubular portion 2a partially. Thus, multiple fixed parts are provided on the inner wall of the end tubular portion 2a in order to fix the attachment portion 60 to the housing 2. The number of the inlet passage 11 is one or more, and the inlet passage 11 is located on an inner side of the fixed parts in a radial direction and extends through the attachment portion 60 in the axial direction.

The filter member 8 is, for example, fixed integrally to the attachment portion 60 of the guide member 6 by multiple fixed parts. The multiple fixed parts are arranged at regular intervals in a circumferential direction around the mesh portion. The multiple fixed parts are obtained via a swaging process by deforming multiple protrusions protruding from an end surface of the attachment portion 60 that contacts the frame portion. Therefore, the filter member 8 and the attachment portion 60 are integrated in a state where the multiple protrusions are inserted into multiple holes of the frame portion. Accordingly, the filter member 8 and the attachment portion 60 are located inside the end tubular portion 2a. The attachment portion 60 includes the multiple fixed parts arranged at intervals around a central axis of the guide member 6.

The support portion 61 of the guide member 6 is a tubular portion that is coaxial with the attachment portion 60 and extends in the axial direction from the attachment portion 60 toward the valve port 25. The support portion 61 supports a tubular wall portion 72 of the valve element 7 that is coaxial with the support portion 61. The support portion 61 is in internal contact with the tubular wall portion 72. The tubular valve element 7 is slidable in the axial direction relative to the support portion 61 while an inner wall surface of the support portion 61 contacts an outer wall surface of the tubular wall portion 72. The valve element 7 is pressed by a spring force of a spring 70 that is an example of an urging member toward the valve port 25 in the axial direction. The spring 70 is interposed between the attachment portion 60 and a step part formed on the tubular wall portion 72.

In the open state where the valve element 7 is separated from the valve seat 24, the working fluid that has passed through the upstream passage 51 flows into the valve compartment 22 through the inlet passage 11. The inflow of the working fluid causes a pressure in the valve compartment 22 to increase. Hence, a fluid pressure in the valve compartment 22 acts on the valve element 7, and thus the fluid pressure acts also on the spring compartment 23 inside the valve element 7. The pressure acting on the spring compartment 23 acts on a lateral surface of the tubular wall portion 72 of the valve element 7 in the valve compartment 22 and acts also on the spring compartment 23 through a slidable part between the tubular wall portion 72 and the support portion 61. The valve element 7 is subjected to the spring force of the spring 70, an acting force from the shaft 4 and the fluid pressure. Therefore, the guide member 6 guides a reciprocating motion of the valve element 7 in the axial direction. The valve element 7 includes the pressure release passage 13 that extends through the bottom portion 71. Thus, the pressure acting on the spring compartment 23, i.e. the pressure acting on an inner compartment of the tubular body is released to the downstream passage 53 through the pressure release passage 13. An inner pressure in the inner compartment of the tubular body can be limited. Accordingly, even when a high fluid pressure acts on the valve compartment 22, a pressure acting on the valve element 7 in the axial direction can be limited.

Figure 3:
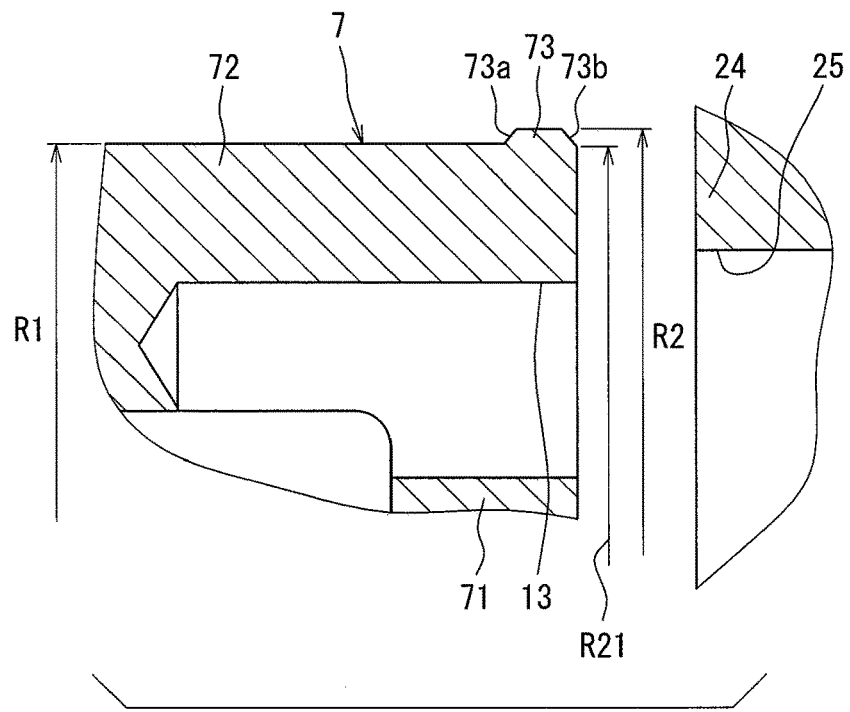
FIG. 3 is a sectional diagram illustrating an end part of a valve element of the electromagnetic valve according to the first embodiment.

As shown in FIG. 3, the downstream end part 73 of the valve element 7 protrudes outward in the radial direction from an outer surface of the tubular wall portion 72. A diameter of the downstream end part 73 is larger than a diameter of a part of the tubular wall portion 72 located upstream of the downstream end part 73 in the flow direction of the working fluid. In other words, a diametrical dimension R2 of the downstream end part 73 is larger than a diametrical dimension R1 of the part of the tubular wall portion 72 located upstream of the downstream end part 73 in the flow direction. The difference in diametrical dimension between the downstream end part 73 and the tubular wall portion 72 provides a step on a lateral surface of the valve element 7. The step is formed on an end part of the valve element 7 closing the valve port 25, and includes an upstream side part and a downstream side part located downstream of the upstream side part and protruding outward in the radial direction more than the upstream side part. The step where the diametrical dimension R2 is larger than the diametrical dimension R1 contributes to a control of the downstream end part 73 to be kept from separating from the valve seat 24 when a pressure in the valve compartment 22 highly increases in the closed state of the valve element 7.

The downstream end part 73 includes a first pressure receiving portion 73a located on an upstream side of a largest diameter part of the downstream end part 73, and a second pressure receiving portion 73b located on a downstream side of the largest diameter part of the downstream end part 73. The first pressure receiving portion 73a has a shape having a gradually decreasing diametrical dimension in an upstream direction. The second pressure receiving portion 73b has a shape having a gradually decreasing diametrical dimension in a downstream direction. Therefore, a degree of protruding of the first pressure receiving portion 73a outward in the radial direction decreases in the upstream direction in cross-section. A degree of protruding of the second pressure receiving portion 73b outward in the radial direction decreases in the downstream direction in cross-section. Each of the first pressure receiving portion 73a and the second pressure receiving portion 73b has a straight inclined surface or a curved surface in cross-section.

An oil, which has a higher pressure than a fuel vapor, flows as the working fluid in the electromagnetic valve 1. In order to restrict leakage of the fluid, the electromagnetic valve 1 includes an O-ring seal 27 mounted on an outer circumference of the end tubular portion 2a and located between the outflow port 12 and a first end of the housing 2 opposite from the electromagnetic solenoid portion 3. Further, the electromagnetic valve 1 includes an O-ring seal 28 mounted on the outer circumference of the end tubular portion 2a and located between the outflow port 12 and a second end of the housing 2 connected to the electromagnetic solenoid portion 3. Each of the O-ring seal 27 and the O-ring seal 28 is an annular sealing member fitted into a groove formed on an entire circumference of the end tubular portion 2a.

The valve element 7 is displaced in the axial direction by a pressing force of the shaft 4 that is moved in the axial direction by the electromagnetic solenoid portion 3. The valve element 7 is switched between the closed state contacting with the valve seat 24 surrounding the valve port 25 and the open state separating from the valve seat 24. In the closed state, a communication between the outflow port 12 and the upstream passage 51 is shut off. A valve portion 42 of the shaft 4 having a tapered shape is separated from a periphery of a discharge valve port 16 and opens the inner discharge passage 14 in the closed state of the valve element 7. Thus, a communication between the downstream passage 53 and the outer discharge passage 15 is allowed in the closed state of the valve element 7. In the open state, the communication between the outflow port 12 and the upstream passage 51 is allowed. The valve portion 42 contacts the periphery of the discharge valve port 16 and closes the inner discharge passage 14 in the open state of the valve element 7. Thus, the communication between the downstream passage 53 and the outer discharge passage 15 is shut off.

The electromagnetic solenoid portion 3 disposed on the second end of the housing 2 includes a yoke 31, a bobbin 34, a coil 32, a movable element 33, the shaft 4, a spring 45 and a connector 35. The bobbin 34 is made of resin and has an approximately cylindrical hollow shape. The bobbin 34 is disposed inside the yoke 31. The coil 32 is wound around an outer circumferential surface of the bobbin 34. The yoke 31 is made of magnetic material. The yoke 31 supports an inner circumferential side of the bobbin 34 and covers an outer circumferential side of the coil 32. The yoke 31 is coaxial with the bobbin 34. The bobbin 34 is coaxial with the housing 2 and houses a part of the housing 2 that supports the shaft 4 slidably. The yoke 31, the movable element 33 and the shaft 4 are coaxial with the housing 2, similar to the bobbin 34.

The movable element 33 is made of magnetic material and has a cylindrical hollow shape. The movable element 33 is supported by the yoke 31 and is reciprocatable in the axial direction. In the electromagnetic solenoid portion 3, the movable element 33 and the yoke 31 form a magnetic circuit.

A large diameter portion 44 of the shaft 4 is fixed to an end surface on a bottom side of the movable element 33 and is coaxial with the movable element 33. The shaft 4 and the movable element 33 are capable of reciprocating together in the axial direction as an integrated single member. The shaft 4 integrally includes an end portion 41 having a relatively small diameter and being concentric with the valve port 25, the valve portion 42 positioned in the inner discharge passage 14, and the large diameter portion 44 slidably fitted into the shaft holding portion 26 via a step portion 43. The inner discharge passage 14 is connected to the outer discharge passage 15 formed in the second end of the housing 2. The outer discharge passage 15 extends in the housing 2 at right angle with the inner discharge passage 14 and is located adjacent to the shaft holding portion 26 between the shaft holding portion 26 and the first end of the housing 2. The outer discharge passage 15 is a passage provided in the housing 2 and used as a drainage port.

The spring 45 used as an example of an urging member is interposed between the step portion 43 and the periphery of the discharge valve port 16. The spring 45 always exerts an urging force pressing the shaft 4 toward the movable element 33. The valve element 7 located in the valve compartment 22 is always pressed by the spring 70 toward the valve port 25. Accordingly, when the electromagnetic solenoid portion 3 is not energized, the shaft 4 is urged by the spring force of the spring 45 while the valve element 7 is pressed by the spring force of the spring 70 toward the valve port 25. Hence, the valve portion 42 opens the discharge valve port 16, and the downstream end part 73 of the valve element 7 closes the valve port 25.

The connector 35 is formed together with an outer skin of the coil 32 and located on a lateral side of the yoke 31. The connector 35 is provided for energizing the coil 32. A terminal 35a inside the connector 35 is electrically connected to the coil 32. The electromagnetic solenoid portion 3 is capable of controlling an electric current flowing through the coil 32 by electrically connecting the terminal 35a to a current controller via the connector 35.

The electromagnetic valve 1 is, as shown in FIG. 1, attached to an automatic transmission. The electromagnetic valve 1 is fixed in a state where the end tubular portion 2a of the housing 2 is fitted into the attachment hole 52 of the passage forming member 5, and the outflow port 12 and the downstream passage 53 is connected to each other. When the coil 32 of the electromagnetic solenoid portion 3 is not energized, the shaft 4 is urged by the spring force of the spring 45 in a direction away from the valve element 7 while the valve element 7 is pressed toward the valve port 25 by the spring 70. Hence, the valve element 7 closes the valve port 25. Further, the valve portion 42 of the shaft 4 opens the discharge valve port 16. In this state, the communication between the upstream passage 51 and the downstream passage 53 is shut off. The oil from the downstream passage 53 flows through the outflow port 12 and the inner discharge passage 14 and is discharged to outside through the outer discharge passage 15.

When the coil 32 is energized in this state, a magnetic flux is generated in the magnetic circuit formed by the yoke 31 and the movable element 33. Thus, the movable element 33 is attracted toward the first end of the housing 2 in the axial direction while the shaft 4 is moved toward the first end of the housing 2 against the urging force of the spring 45. At this time, the valve portion 42 closes the discharge valve port 16, and the valve element 7 is pressed in the upstream direction by the shaft 4, thereby moving toward the first end of the housing 2 and opening the valve port 25. In this state, the communication between the upstream passage 51 and the downstream passage 53 is allowed. The oil from the upstream passage 51 flows into the downstream passage 53 through the inlet passage 11, the valve compartment 22, the valve port 25 and the outflow port 12. Accordingly, a switching control (i.e. on/off control) of energization of the coil 32 enables a switching control (i.e. on/off control) of pressure of the working fluid in an oil discharge passage.

Therefore, a pressure and a flow rate of the working fluid used for control of a controlled object can be controlled.

Next, actions and effects provided by the electromagnetic valve 1 of the first embodiment will be described. The electromagnetic valve 1 includes: the inlet passage 11 through which the upstream passage 51 communicates with the valve compartment 22; the valve element 7 located in the valve compartment 22 to open or close the valve port 25 between the open state and the closed state; and the guide member 6 including the support portion 61 in the valve compartment 22 to support the valve element 7 slidably in the axial direction. The valve element 7 is a tubular body including the bottom portion 71 pressed by the shaft 4. The valve element 7 includes the pressure release passage 13 extending through a part of the bottom portion 71 which does not contact the shaft 4. The inner compartment of the tubular body communicates with the valve port 25 through the pressure release passage 13 in the closed state of the valve element 7.

According to this configuration, even when the valve element 7 closes the valve port 25 in the closed state, the inner compartment of the valve element 7 and the valve port 25 communicate with each other through the pressure release passage 13. Thus, even in the closed state of the valve element 7, a pressure in the inner compartment of the valve element 7 can be released to the downstream passage 53 through the pressure release passage 13 and the valve port 25. When a pressure of the working fluid supplied to the valve compartment 22 through the inlet passage 11 becomes high, the pressure can be divided into an inside and an outside of the valve element 7 through the slidable part between the guide member 6 and the valve element 7. Hence, the pressure in the inner compartment of the valve element 7 can be maintained to be high. Therefore, the valve element 7 appropriately functions as a valve capable of switching an output pressure by opening or closing the valve port 25.

Since the pressure in the inner compartment of the valve element 7 can be released to the outside of the electromagnetic valve 1 through the pressure release passage 13, a force pressing the bottom portion 71 of the valve element 7 in the axial direction can be reduced. Thus, a pressure pressing the valve element 7 toward the valve port 25 can be limited. Since the force pressing the valve element 7 toward the valve port 25 can be limited, a necessary force for driving the shaft 4 by the electromagnetic solenoid portion 3 can be reduced. Since a valve driving force of the electromagnetic solenoid portion 3 can be reduced, it can be avoid that a passage through which the working fluid passes, such as the inlet passage 11 or the valve compartment 22, is designed to be smaller in passage cross-sectional area. Further, the flow-rate characteristic of the electromagnetic valve 1 can be maintained without size enlargement of the electromagnetic valve 1. According to the electromagnetic valve 1 of the present disclosure, the flow-rate characteristic can be maintained, and the size of the electromagnetic vale 1 can be reduced while the necessary valve driving force is reduced. Further, according to the electromagnetic valve 1, not only the size enlargement can be avoided, but also a necessary current value for valve driving can be reduced. Thus, energy consumption can be reduced. According to the electromagnetic valve 1, a desired valving function can be obtained by a simple valve configuration compared to a case where a spool valve is used.

The valve element 7 is configured such that the downstream end part 73 that contacts the periphery of the valve port 25 in the closed state protrudes outward in the radial direction more than the outer surface of the tubular body located upstream of the downstream end part 73. Hence, a fluid pressure acting in the downstream direction can be received by the downstream end part 73 protruding outward in the radial direction. Therefore, a force making the valve element 7 be in contact with the valve seat 24 can be ensured, and a shutting function can be secured.

A downstream end surface of the downstream end part 73 that contacts the periphery of the valve port 25 has a diametrical dimension R21 approximately equal to the diametrical dimension R1 of the outer surface of the tubular body located upstream of the downstream end part 73. Accordingly, when the valve element 7 is processed, a force acting on the second pressure receiving portion 73b that faces to the valve seat 24 can be reduced by forming the first pressure receiving portion 73a.

Second Embodiment

A second embodiment of the present disclosure will be described with reference to FIG. 4. In the second embodiment, a component assigned the same numeral as that in the drawings associated with the first embodiment and a component which is not explained are similar to those of the first embodiment and exert similar actions and effects to the first embodiment. In the second embodiment, only a different part from the first embodiment will be described.

Figure 4:
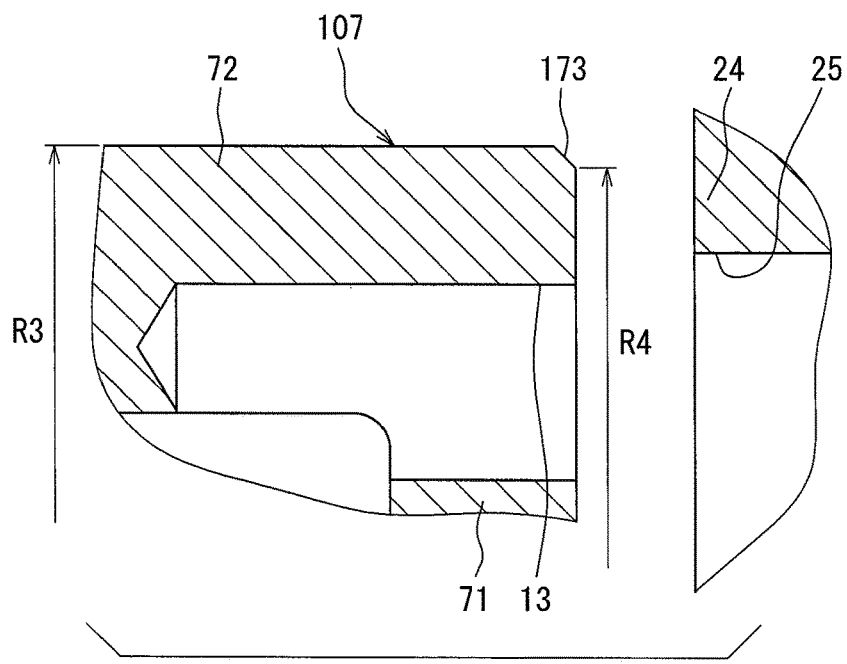
FIG. 4 is a sectional diagram illustrating an end part of a valve element of an electromagnetic valve according to a second embodiment of the present disclosure.

As shown in FIG. 4, a valve element 107 of the second embodiment includes a downstream end part 173 that includes a pressure receiving portion in a downstream end of the valve element 107 contacting a valve seat 24. The pressure receiving portion has a shape having a gradually decreasing diametrical dimension in a downstream direction in a flow of working fluid. A diametrical dimension R4 of a part of the pressure receiving portion contacting the valve seat 24 is smaller than a diametrical dimension R3 of a tubular wall portion 72 on an upstream side of the downstream end part 173. The pressure receiving portion protrudes outward in a radial direction and faces to the valve seat 24. A degree of protruding of the pressure receiving portion radially outward decreases in the downstream direction in cross-section. The cross-sectional shape of the pressure receiving portion includes a straight inclined surface or a curved surface.

Third Embodiment

A third embodiment of the present disclosure will be described with reference to FIG. 5. In the third embodiment, a component assigned the same numeral as that in the drawings associated with the first embodiment and a component which is not explained are similar to those of the first embodiment and exert similar actions and effects to the first embodiment. In the third embodiment, only a different part from the first embodiment will be described.

Figure 5:
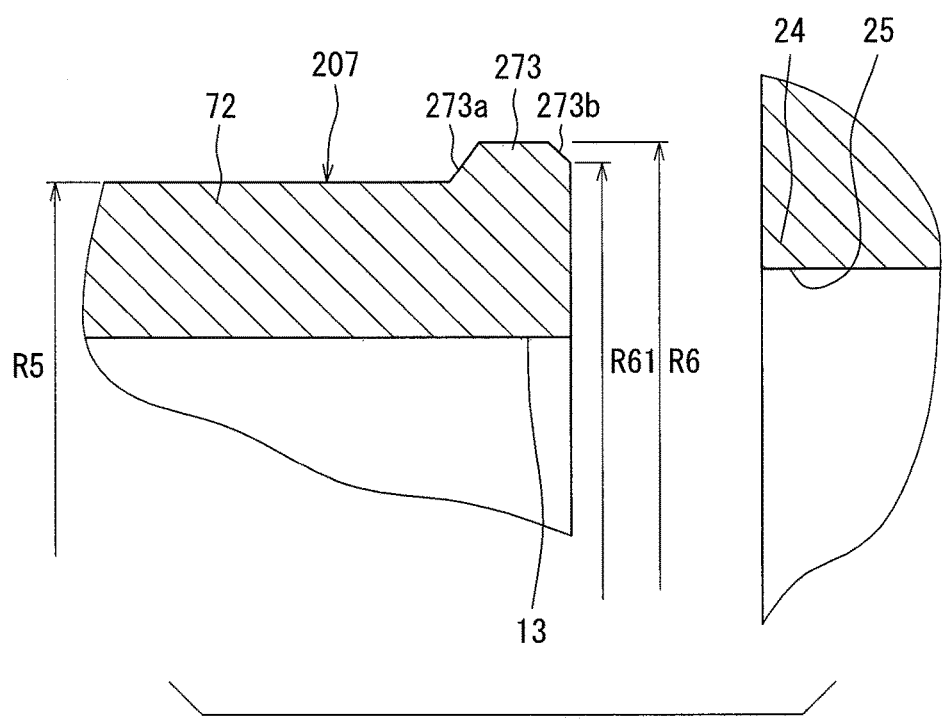
FIG. 5 is a sectional diagram illustrating an end part of a valve element of an electromagnetic valve according to a third embodiment of the present disclosure.

As shown in FIG. 5, a valve element 207 of the third embodiment includes a downstream end part 273 that protrudes outward in a radial direction from an outer surface of a tubular wall portion 72. A diameter of the downstream end part 273 is larger than a diameter of a part of the tubular wall portion 72 located on an upstream side of the downstream end part 273. In other words, a diametrical dimension R6 of the downstream end part 273 is larger than a diametrical dimension R5 of the part of the tubular wall portion 72 located on the upstream side of the downstream end part 273. The difference in diametrical dimension between the downstream end part 273 and the tubular wall portion 72 provides a step on a lateral surface of the valve element 207. The step is located on an end part of the valve element 207 closing the valve port 25. The step includes an upstream side part and a downstream side part that is located downstream of the upstream side part and protrude outward in the radial direction more than the upstream side part. The step where the diametrical dimension R6 is larger than the diametrical dimension R5 contributes to a control of the downstream end part 273 to be kept from separating from the valve seat 24 when a pressure in a valve compartment 22 highly increases in the closed state of the valve element 7.

The downstream end part 273 includes a first pressure receiving portion 273a located on an upstream side of a largest diameter part of the downstream end part 273, and a second pressure receiving portion 273b located on a downstream side of the largest diameter part of the downstream end part 273. The first pressure receiving portion 273a has a shape having a gradually decreasing diametrical dimension in an upstream direction. The second pressure receiving portion 273b has a shape having a gradually decreasing diametrical dimension in a downstream direction. Therefore, a degree of protruding of the first pressure receiving portion 273a outward in the radial direction decreases in the upstream direction in cross-section. A degree of protruding of the second pressure receiving portion 273b outward in the radial direction decreases in the downstream direction in cross-section. Each of the first pressure receiving portion 273a and the second pressure receiving portion 273b has a straight inclined surface or a curved surface in cross-section. A diametrical dimension R61 of a downstream end surface of the valve element 207 contacting the valve seat 24 is larger than the diametrical dimension R5 of the part of the tubular wall portion 72 located on the upstream side of the downstream end part 273.

According to the electromagnetic valve of the third embodiment, the downstream end part 273 of the valve element 207 is configured that the diametrical dimension R61 of the downstream end surface contacting the periphery of the valve port 25 is larger than the diametrical dimension R5 of the outer surface of the tubular body located on the upstream side of the downstream end part 273. Hence, in the valve element 207, the diametrical dimension of the part contacting the valve seat 24 is larger than the diametrical dimension of the part of the tubular wall portion 72 located upstream of the downstream end part 273. Thus, the pressure receiving portion 273a can receive a high fluid pressure, and the downstream end surface of the valve element 207 can be pressed against the valve seat 24. Therefore, in addition to the effect of limiting a valve driving force due to the pressure release through the pressure release passage 13, a valving function to shut off a flow of the working fluid can be ensured by sufficiently utilizing the fluid pressure causing the valve element 207 to contact the valve seat 24 in the closed state.

The disclosure in the present specification is not limited to the exemplified embodiments. The disclosure includes the exemplified embodiments and modifications based on these by a skilled person. For example, the disclosure is not limited to a combination of components or elements shown in the embodiments, and can be modified variously to be implemented. The disclosure can be implemented based on a variety of combinations. The disclosure is capable of having an additional portion that can be added to the embodiments. The disclosure includes one from which the components or elements of the embodiments are omitted. The disclosure includes displacement or combination of components or elements between one embodiment and another embodiment. The disclosed technical scope is not limited to the descriptions of the embodiments.

In the above-described embodiments, the inlet passage 11 is a passage extending through the attachment portion 60 of the guide member 6 in the axial direction, and the inlet passage 11 is positioned inside the end tubular portion 2a. The inlet passage 11 is not limited to such embodiments, and for example, may include a passage extending through the end tubular portion 2a in the radial direction and connecting the exterior and the valve compartment 22.

The valve element 7 of the above-described embodiments is slidable in the axial direction relative to the guide member 6 with contacting the inner side of the support portion 61 of the guide member 6. Alternatively, the valve element 7 may be configured to slide relative to the guide member 6 with contacting an outer side of the support portion 61 of the guide member 6.

The electromagnetic valve 1 of the above-described embodiment may not include the O-ring seal 27 or the O-ring seal 28 as long as a certain degree of sealing performance is maintained.

The working fluid flowing through the electromagnetic valve 1 of the above-described embodiments may employ another liquid having a high viscosity other than the oil.

The O-ring seal 27 or the O-ring seal 28 of the above-described embodiments is an example of a sealing member, and a sealing member applicable to the electromagnetic valve 1 is not limited to such rubber member having a circular shape in cross-section. For example, a material for the sealing member may be an elastically-deformable material other than rubber, and a cross-sectional shape thereof may be rectangular.

In the above-described embodiments, the number or shape of the pressure release passage 13 are not limited a certain number or shape as long as the pressure release passage 13 is provided on a position of the bottom portion 71 other than a part of the bottom portion 71 contacting the shaft 4. A passage cross-sectional shape of the pressure release passage 13 may be rectangular, circular, arc-like, or slit-like, for example.

Additional advantages and modifications will readily occur to those skilled in the art. The disclosure in its broader terms is therefore not limited to the specific details, representative apparatus, and illustrative examples shown and described.

What is claimed is:

1. An electromagnetic valve comprising:
   a housing including an end tubular portion fitted to an attachment hole of a passage forming member, and a valve compartment positioned on an inner side of the end tubular portion, the passage forming member including an upstream passage through which a working fluid flows toward the electromagnetic valve, and a downstream passage through which the working fluid flows out of the electromagnetic valve;
   an inlet passage positioned on the inner side of the end tubular portion or provided in the end tubular portion, the upstream passage and the valve compartment communicating with each other through the inlet passage;
   a valve element provided in the valve compartment to open or close a valve port in between an open state in which the working fluid is allowed to flow from the valve compartment to the downstream passage and a closed state in which a flow of the working fluid is shut off;
   a guide member including a support portion positioned in the valve compartment, the support portion supporting the valve element slidably in an axial direction;
   a shaft pressing and moving the valve element in the axial direction to be in the open state; and
   an electromagnetic solenoid portion generating a driving force for driving the shaft in the axial direction, wherein
   the valve element having a tubular body includes a pressure release passage through which an inner compartment of the tubular body communicates with the valve port in the closed state of the valve element.

2. The electromagnetic valve according to claim 1, wherein the valve element is configured to have a downstream end part contacting a periphery of the valve port in the closed state, and the downstream end part protrudes outward in a radial direction more than an outer surface of the tubular body positioned upstream of the downstream end part.

3. The electromagnetic valve according to claim 2, wherein the downstream end part is configured such that a diametrical dimension of a downstream end surface contacting the periphery of the valve port is larger than a diametrical dimension of the outer surface of the tubular body positioned upstream of the downstream end part.

4. The electromagnetic valve according to claim 2, wherein the downstream end part is configured such that a diametrical dimension of a downstream end surface contacting the periphery of the valve port is equal to a diametrical dimension of the outer surface of the tubular body positioned on the upstream side of the downstream end part.

5. The electromagnetic valve according to claim 1, wherein
   the tubular body includes a bottom portion pressed against the shaft, and
   the pressure release passage extends through a part of the bottom portion which does not contact the shaft.

* * * * *